(12) United States Patent
Nishikori et al.

(10) Patent No.: US 12,573,563 B2
(45) Date of Patent: Mar. 10, 2026

(54) ELECTROLYTIC CAPACITOR WITH ELECTROLYTE AND HYDROPHILIC COMPOUND CONTAINING LIQUID

(71) Applicant: SUN Electronic Industries Corp., Shijonawate-City (JP)

(72) Inventors: Hirokazu Nishikori, Shijonawate-City (JP); Takashi Takezawa, Shijonawate-City (JP); Masakazu Hosogi, Shijonawate-City (JP); Tadahito Ito, Shijonawate-City (JP)

(73) Assignee: SUN Electronic Industries Corp., Shijonawate-City (JP)

( * ) Notice: Subject to any disclaimer, the term of this patent is extended or adjusted under 35 U.S.C. 154(b) by 27 days.

(21) Appl. No.: 18/683,922

(22) PCT Filed: Aug. 23, 2022

(86) PCT No.: PCT/JP2022/031677
§ 371 (c)(1),
(2) Date: Feb. 15, 2024

(87) PCT Pub. No.: WO2023/027059
PCT Pub. Date: Mar. 2, 2023

(65) Prior Publication Data
US 2024/0347280 A1     Oct. 17, 2024

(30) Foreign Application Priority Data
Aug. 26, 2021     (JP) ................................. 2021-137946

(51) Int. Cl.
| | |
|---|---|
| *H01G 9/10* | (2006.01) |
| *H01G 9/035* | (2006.01) |
| *H01G 9/15* | (2006.01) |

(52) U.S. Cl.
CPC ............... *H01G 9/10* (2013.01); *H01G 9/035* (2013.01); *H01G 9/15* (2013.01); *H01G 9/151* (2013.01)

(58) Field of Classification Search
None
See application file for complete search history.

(56) References Cited

U.S. PATENT DOCUMENTS

| | | | |
|---|---|---|---|
| 6,349,028 B1 | 2/2002 | Komatsu | |
| 10,566,142 B2 | 2/2020 | Sato et al. | |

(Continued)

FOREIGN PATENT DOCUMENTS

| | | |
|---|---|---|
| JP | 2006-253458 A | 9/2006 |
| TW | 452811 B | 9/2001 |

(Continued)

OTHER PUBLICATIONS

Extended European Search Report dated Jun. 10, 2025, issued in corresponding European Patent Application No. 22861347.7.

(Continued)

*Primary Examiner* — Eric W Thomas
(74) *Attorney, Agent, or Firm* — Morgan, Lewis & Bockius LLP

(57) ABSTRACT

An electrolytic capacitor 1 includes: a capacitor element 3 in which an anode foil 5 and a cathode foil 7 each having a dielectric oxide film face each other across a separator 6; a body case 2 that houses the capacitor element 3; and a sealing member 4 that seals the body case 2. An electrolyte and a hydrophilic compound are held between the anode foil 5 and the cathode foil 7. A sealing member deterioration preventing agent immiscible with the hydrophilic compound is arranged inside the body case 2.

9 Claims, 4 Drawing Sheets

(56) References Cited

U.S. PATENT DOCUMENTS

| | | | | |
|---|---|---|---|---|
| 2008/0316679 A1* | 12/2008 | Sugihara | ............... | H01G 9/145 |
| | | | | 361/504 |
| 2018/0218849 A1 | 8/2018 | Matsuura et al. | | |
| 2020/0227208 A1 | 7/2020 | Tsubaki et al. | | |
| 2021/0327653 A1 | 10/2021 | Takezawa et al. | | |
| 2022/0328255 A1 | 10/2022 | Takezawa et al. | | |
| 2022/0367123 A1 | 11/2022 | Takezawa et al. | | |
| 2023/0335342 A1 | 10/2023 | Sato et al. | | |

FOREIGN PATENT DOCUMENTS

| | | |
|---|---|---|
| WO | 2020/059091 A1 | 3/2020 |
| WO | 2021/049190 A1 | 3/2021 |
| WO | 2021/149739 A1 | 7/2021 |

OTHER PUBLICATIONS

International Search Report (with partial translation) and Written Opinion dated Nov. 15, 2022, issued in corresponding International Patent Application No. PCT/JP2022/031677.
Office Action with search report dated Dec. 3, 2025, issued in corresponding Taiwan Patent Application No. 20220131832.

* cited by examiner

ELECTROLYTIC CAPACITOR WITH ELECTROLYTE AND HYDROPHILIC COMPOUND CONTAINING LIQUID

TECHNICAL FIELD

The present invention relates to an electrolytic capacitor that is sealed with a sealing member.

BACKGROUND ART

A conventional electrolytic capacitor is disclosed in Patent Document 1. This electrolytic capacitor includes a body case, a capacitor element, and a sealing member. The body case is formed of metal in a bottomed cylindrical shape, with one end of its cylindrical circumferential wall closed and the other end left open as an opening.

The capacitor element has an anode foil and a cathode foil each having a dielectric oxide film formed on it wound up with a separator in between and is housed in the body case. Between the anode and cathode foils, an electrolytic solution containing a sealing member deterioration preventing agent is held. To dissolve the sealing member deterioration preventing agent, the electrolytic solution contains, for example, a polyethylene glycol-polypropylene glycol copolymer. The opening of the body case having the capacitor element housed in it is sealed by the sealing member, which is made of rubber.

With the capacitor described above, the sealing member deterioration preventing agent permeates the sealing member to suppress deterioration of the sealing member in a high-temperature environment such as the engine room. This makes it possible to suppress evaporation of the electrolytic solution and to stably maintain the characteristics of the electrolytic capacitor over a long period of time.

CITATION LIST

Patent Literature

Patent Document 1: WO2020/059091

SUMMARY OF INVENTION

Technical Problem

However, the conventional electrolytic capacitor described above has the following shortcomings: the electrolytic solution contains a polymer compound with a polyoxyethylene group or a polyoxypropylene group and has high viscosity. This results in poor permeation of the sealing member with the sealing member deterioration preventing agent dissolved in the electrolytic solution. As a result, in a high-temperature environment over 150° C., the sealing member may develop cracks before it is sufficiently permeated with the sealing member deterioration preventing agent, causing evaporation of the electrolytic solution, and this may lead to a shortened life of the electrolytic capacitor.

In addition, increasing the content of the sealing member deterioration preventing agent in the electrolytic solution for its fast permeation into the sealing member increases the amount of sealing member deterioration preventing agent, which is electrically insulating, inside the capacitor element. This reduces the amount of electrolytic solution inside the capacitor element by the amount of sealing member deterioration preventing agent added, and makes it difficult to reduce the ESR of the electrolytic capacitor.

The present invention is aimed at providing an electrolytic capacitor with an extended life and a low ESR.

Solution to Problem

To achieve the above object, according to one aspect of the present invention, an electrolytic capacitor includes: a capacitor element in which an anode foil and a cathode foil each having a dielectric oxide film face each other across a separator; a body case that houses the capacitor element; and a sealing member that seals the body case. An electrolyte and a hydrophilic compound are held between the anode foil and the cathode foil, and a sealing member deterioration preventing agent immiscible with the hydrophilic compound is arranged inside the body case.

In the electrolytic capacitor configured as described above, preferably, the sealing member deterioration preventing agent is a terpenoid, an unsaturated fatty acid, a polyglycerol ester containing within its molecule an unsaturated fatty acid group, a saturated fatty acid, or a derivative of any of these.

In the electrolytic capacitor configured as described above, preferably, the hydrophilic compound forms at least part of the solvent in the electrolytic solution having the electrolyte dissolved in it, and has a boiling point of 180° C. or higher.

In the electrolytic capacitor configured as described above, preferably, the electrolyte is a solid electrolyte. The capacitor element may be impregnated with a predetermined liquid. The hydrophilic compound may form at least part of the liquid. The hydrophilic compound may have a boiling point of 180° C. or higher.

In the electrolytic capacitor configured as described above, preferably, the hydrophilic compound has a boiling point of 205° C. or higher.

In the electrolytic capacitor configured as described above, preferably, the hydrophilic compound contains sulfolane, ethylene glycol, diethylene glycol, triethylene glycol, polyethylene glycol, glycerol, polyglycerol, or a derivative of any of these.

In the electrolytic capacitor configured as described above, preferably, the hydrophilic compound contains polyethylene glycol with a molecular weight of 1000 or more.

In the electrolytic capacitor configured as described above, preferably, the electrolyte is a solid electrolyte. A solid-at-normal-temperature substance having an electrolyte dissolved in a solvent that is solid at normal temperature and that melts in an environment of temperature higher than normal temperature may be arranged in the capacitor element. The hydrophilic compound may form at least part of the solvent.

In the electrolytic capacitor configured as described above, preferably, the hydrophilic compound is PEG2000, PEG4000, PEG6000, PEG10000, PEG20000, xylitol, or sorbitol.

Advantageous Effects of Invention

According to this embodiment, an electrolyte and a hydrophilic compound is held between an anode foil and a cathode foil, and a sealing member deterioration preventing agent immiscible with a hydrophilic compound is arranged inside a body case. This allows fast permeation of the sealing member deterioration preventing agent into the sealing member, and thus it is possible to suppress the deterioration of the sealing member even in a high-temperature environment and to achieve an electrolytic capacitor with an extended life and a low ESR.

DESCRIPTION OF EMBODIMENTS

First Embodiment

Figure 1:
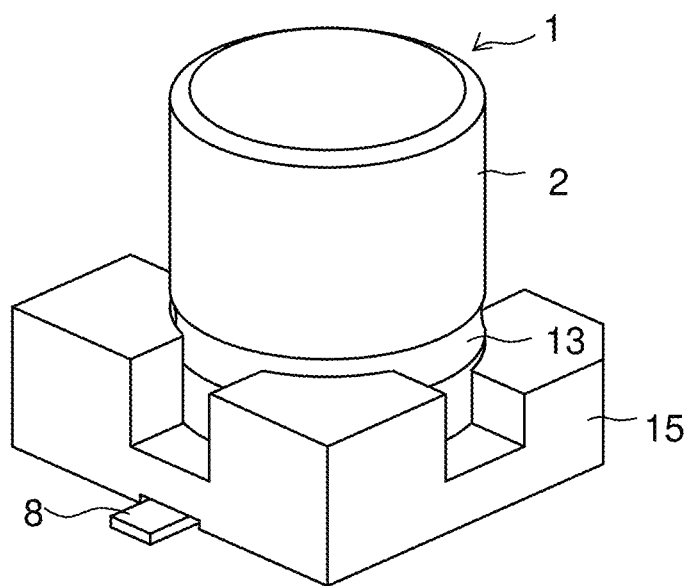
FIG. 1 is a perspective view of an electrolytic capacitor according to a first embodiment of the present invention as seen from above.
Figure 2:
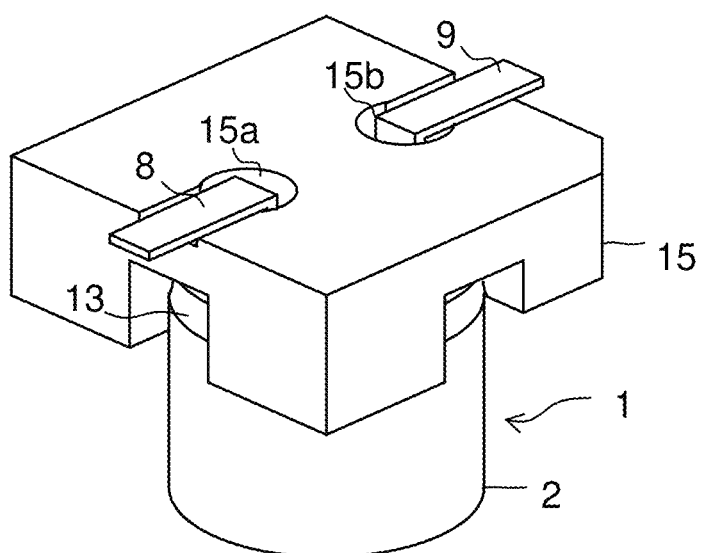
FIG. 2 is a perspective view of the electrolytic capacitor according to the first embodiment of the present invention as seen from below.

Embodiments of the present invention will be described below with reference to the accompanying drawings. FIGS. 1 and 2 are perspective views of an electrolytic capacitor 1 of a first embodiment as seen from above and below respectively. The electrolytic capacitor 1 is fitted on a seat plate 15 formed of synthetic resin. The seat plate 15 has a pair of through holes 15a and 15b.

The electrolytic capacitor 1 has lead terminals 8 and 9, and the lead terminals 8 and 9 inserted through the through holes 15a and 15b in the seat plate 15 are bent outward. The electrolytic capacitor 1 is placed on a circuit board with the top face of the body case 2 held by an automated machine, and is mounted there with the lead terminals 8 and 9 soldered to lands on the circuit board.

Figure 3:
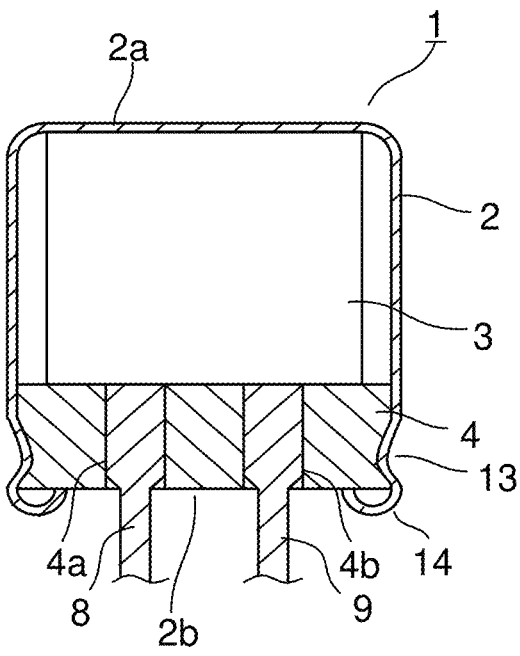
FIG. 3 is a sectional front view of the electrolytic capacitor according to the first embodiment of the present invention.

FIG. 3 is a sectional front view of the electrolytic capacitor 1. The electrolytic capacitor 1 includes a body case 2, a capacitor element 3, and a sealing member 4. The body case 2 is formed of metal such as aluminum in a bottomed cylindrical shape with a circular cross section, with one end closed with an end wall portion 2a and the other end left open as an opening 2b. The capacitor element 3 is housed in the body case 2, and the opening 2b is sealed with the sealing member 4.

The sealing member 4 is formed of a molding of an insulating elastic material in the shape of a disk and has a pair of through holes 4a and 4b. The lead terminals S and 9 of the capacitor element 3 are inserted through the through holes 4a and 4b by press-fitting.

Usable for the sealing member 4 is rubber such as butyl rubber, isoprene rubber, silicone rubber, fluorine rubber, ethylene propylene rubber, or ethylene propylene diene rubber. The rubber may be a composite material containing any of these. Butyl rubber is preferable because it is high in environmental resistance, such as heat-aging resistance, chemical resistance, and weather resistance, high in electrical insulation, and low in gas permeation.

With the sealing member 4 put in the opening 2b of the body case 2, the body case 2 is subjected to swaging in which a pressure is applied to its outer circumferential face. This forms on the body case 2 a protruding portion 13 that protrudes inward. The protruding portion 13 compresses the outer circumferential face of the sealing member 4 inward, bringing this into close contact with the inner circumferential face of the body case 2. The compression of the sealing member 4 brings the inner surfaces of the through holes 4a and 4b into close contact with the lead terminals 8 and 9. This permits the opening 2b in the body case 2 to be sealed with the sealing member 4 so that the electrolyte held in the capacitor element 3 does not leak out of the body case 2.

The open end of the body case 2 forms a folded-back portion 14 that is folded back toward the outer face (the face opposite from the capacitor element 3) of the sealing member 4. The folded-back portion 14 and the protruding portion 13 prevent the sealing member 4 from falling out of the body case 2.

Figure 4:
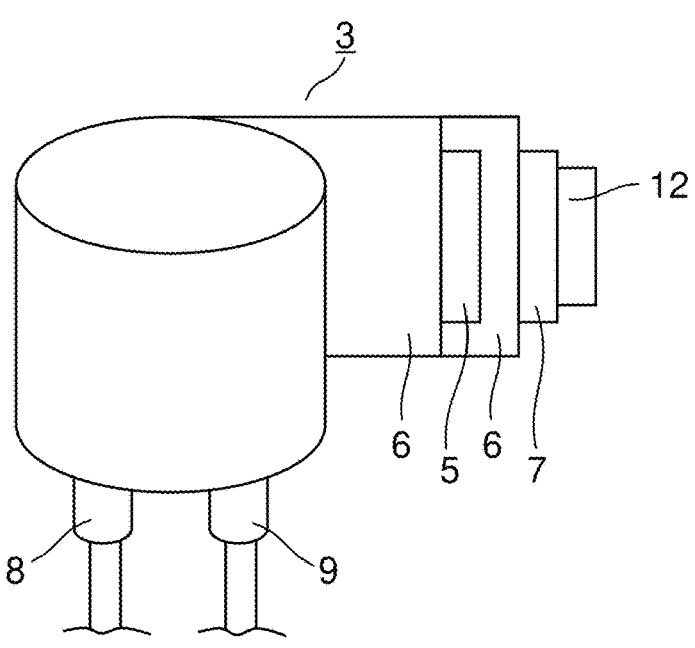
FIG. 4 is a perspective view of a capacitor element according to the first embodiment of the present invention.

FIG. 4 is a perspective view of the capacitor element 3. The capacitor element 3 includes an anode foil 5, a cathode foil 7, and a separator 6, each formed in the shape of an elongate strip. The capacitor element 3 is formed by winding the anode foil 5 and the cathode foil 7 into a cylindrical shape with the separator 6 in between. The anode foil 5 and the cathode foil 7 thus form a pair of electrodes that face each other across the separator 6.

The strip-shaped anode foil 5, the cathode foil 7, and the separator 6 are elongate in the winding direction (longitudinal direction), and their dimension in the direction (lateral direction) perpendicular to the wining direction is smaller than the dimension in the wining direction. The winding end of the anode foil 5 or the cathode foil 7 is fixed with tape 12. To the anode foil 5, the lead terminal 8 is connected, and to the cathode foil 7, the lead terminal 9 is connected.

The separator 6 is formed such that its dimension in the lateral direction (axial direction) is larger than the dimension of the anode foil 5 and the cathode foil 7 in the lateral direction. Thus, the separator 6 extends beyond the anode foil 5 and the cathode foil 7 upward (toward the end wall portion 2a) and downward (toward the opening 2b) so as to prevent a short circuit between the anode foil 5 and the cathode foil 7.

The anode foil 5 and the cathode foil 7 are composed chiefly of aluminum and are etched to have increased surface areas. The anode foil 5 may be formed of a valve-action metal such as tantalum, niobium, or titanium. The anode foil 5 has a dielectric oxide film formed on its surface by chemical conversion treatment. The cathode foil 7 may have formed on its surface a natural oxide film, or a dielectric oxide film by chemical conversion treatment.

Used as the separator 6 is a sheet of a fiber such as of cellulose, polyethylene terephthalate, or aramid. For stability under high temperature (for example, 150° C.), it is preferable that the separator 6 contain a synthetic fiber.

Between the anode foil 5 and the cathode foil 7 of the capacitor element 3, an electrolytic solution prepared by dissolving an electrolyte in a solvent is held. By immersing the capacitor element 3 in the electrolytic solution for a predetermined time, the electrolytic solution permeates the separator 6 to be held between the anode foil 5 and the cathode foil 7. The electrolytic solution practically functions as a cathode. The electrolytic solution can also repair defects in the oxide film on the anode foil 5 and the cathode foil 7.

Here, at least either the solvent or an additive in the electrolytic solution is formed of a hydrophilic compound, and the sealing member deterioration preventing agent, which will be described later, is immiscible with the hydrophilic compound.

Dissolved in the solvent, the electrolyte exhibits electrical conductivity by dissociating into ions. Usable as the electrolyte is, for example, a salt containing an anion or a salt containing an anion and a cation. Specifically, an organic amine salt of a boric acid compound or a carboxylic acid compound or the like is used as the electrolyte. Usable as the boric acid compound is, for example, boric acid, borodioxalic acid, borodiglycolic acid, or boro-disalicilic acid. Usable as the carboxylic acid is, for example, phthalic acid, fumaric acid, adipic acid, maleic acid, or hydroxynitrobenzoic acid. Usable as the organic amine is, for example, a secondary organic amine, a tertiary organic amine, a quaternary organic amine, or an imidazole compound.

Used as the solvent for the electrolytic solution is a high-boiling-point solvent with a boiling point of 150° C. or higher. Usable as the solvent is, for example, gamma-butyrolactone, sulfolane, ethylene glycol, diethylene glycol, triethylene glycol, polyethylene glycol, glycerol, polyglycerol, or a derivative of any of these.

It is preferable that a hydrophilic compound be used as at least part of the solvent. Examples of hydrophilic compound solvents include sulfolane, ethylene glycol, diethylene glycol, triethylene glycol, polyethylene glycol, glycerol, polyglycerol, and derivatives of these.

These hydrophilic compound solvents reduce the solubility of the sealing member deterioration preventing agent, described later, in the electrolytic solution. Thus, for example, even if a hydrophilic compound solvent is used in an amount ten times that of the sealing member deterioration preventing agent, part of the sealing member deterioration preventing agent remains undissolved. That is, the sealing member deterioration preventing agent is not soluble in the hydrophilic compound solvent and thus is immiscible with the hydrophilic compound solvent.

It is preferable that the hydrophilic compound constitute 50% by weight or more of the solvent, more preferably 80% by weight or more, and even more preferably 90% by weight or more. In this way, the sealing member deterioration preventing agent is immiscible with the electrolytic solution containing the hydrophilic compound, and the electrolytic solution does not dissolve the sealing member deterioration preventing agent or keeps its solubility low. Thus, part of the sealing member deterioration preventing agent is left undissolved. It is thus possible to keep the conductivity of the electrolytic solution high, and the sealing member deterioration preventing agent more easily permeate the sealing member 4.

To use the electrolytic capacitor 1 in a high-temperature environment with a temperature of 150° C. or higher, it is preferable that a solvent with a boiling point of 180° C. or higher constitute 95% or more of the solvent in the electrolytic solution. Moreover, assuming that the electrolytic capacitor 1 is used temporarily in a high-temperature environment up to around 175° C., it is more preferable that a solvent with a boiling point of 205° C. or higher constitute 95% or more of the solvent in the electrolytic solution. In this way, when used in combination with the sealing member deterioration preventing agent, the electrolytic capacitor 1 can have an extended life even in a high-temperature environment with a temperature of 150° C. or higher.

Examples of solvents with a boiling point of 205° C. or higher include sulfolane, diethylene glycol, triethylene glycol, polyethylene glycol, glycerol, polyglycerol, and derivatives of these. Among these, diethylene glycol, triethylene glycol, polyethylene glycol, glycerol, polyglycerol, or a derivative of any of them can be used to improve the repair properties and the withstand voltage of the dielectric oxide film.

An additive may be added to the electrolyte. Examples of the additive include a nitro compound, a solid hydrophilic compound, a hydrophilic antioxidant, a withstand voltage improver (such as polyalkylene glycol), sugar, glycerol, polyglycerol, a derivative of any of these, a phosphate ester, and a gas absorber.

The nitro compound is a compound containing a nitro group. Usable as the nitro compound is, for example, dinitrobenzene, p-nitrophenol, m-nitroacetophenone, or hydroxynitrobenzoic acid. The nitro compound can absorb the gas emanating from the cathode foil.

A solid hydrophilic compound as an additive may be added to the hydrophilic compound solvent described above or to a lipophilic solvent such as gamma-butyrolactone. A solid hydrophilic compound as an additive makes the sealing member deterioration preventing agent immiscible with the electrolyte containing hydrophilic compound, and then the electrolyte does not dissolve the sealing member deterioration preventing agent or keeps its solubility low. As a result, part of the sealing member deterioration preventing agent remains undissolved in the electrolyte containing the hydrophilic compound. One example of the hydrophilic compound used as an additive is polyethylene glycol with a molecular weight of 1000 or more.

Since the hydrophilic antioxidant does not permeate the sealing member 4 easily, it can be retained in the capacitor element 3 for an extended period to suppress oxidation of the electrolyte and the separator 6.

It is preferable that the electrolyte occupy 80% or more of the volume of the space in the capacitor element 3. In this way, the life of the electrolytic capacitor 1 can be extended.

Furthermore, inside the body case 2 of the electrolytic capacitor 1, a sealing member deterioration preventing agent is arranged. Used as the sealing member deterioration preventing agent is a compound that is soluble in a lipophilic solvent and that is immiscible with a hydrophilic compound contained in the electrolyte. The sealing member deterioration preventing agent inside the body case 2 permeates the sealing member 4 through intermolecular gaps in the sealing member 4.

Selectable as the sealing member deterioration preventing agent is a compound of which part remains undissolved in a hydrophilic solvent in an amount 10 times that of the sealing member deterioration preventing agent but that is soluble in a lipophilic solvent. Here, examples of the lipophilic solvent include gamma-butyrolactone, diethylene glycol monobutyl ether acetate, and n-hexane. A compound soluble in a lipophilic solvents has a solubility parameter (SP value) close to that of the rubber sealing member 4, and thus it can be used as the sealing member deterioration preventing agent that permeates the sealing member 4 fast.

The sealing member deterioration preventing agent may be used dissolved in a hydrophobic solvent. Usable as the hydrophobic solvent is a solvent that is not soluble in a hydrophilic solvent. With a sealing member deterioration preventing agent that is solid at normal temperature, dissolving it in a hydrophobic solvent can improve its permeation in the sealing member 4.

Usable as the sealing member deterioration preventing agent is a terpenoid such as a fat-soluble vitamin containing within its molecule an isoprene skeleton (where the main chain of the isoprene skeleton may have a single or double bond, or may have a cyclic structure), an unsaturated fatty acid, a polyglycerol ester containing an unsaturated fatty acid group within its molecule, a saturated fatty acid, or a derivative of any of these. As the sealing member deterioration preventing agent that is solid at normal temperature, 2,2'-methylenebis(4-ethyl-6-tert-butylphenol) can be used.

Examples of the fat-soluble vitamin include vitamin A, vitamin D, vitamin E, and vitamin K, vitamin A is a compound with a carotenoid skeleton and includes, for example, retinol, beta-carotene, alpha-carotene, beta-cryptoxanthin, and astaxanthin, vitamin D includes, for example, vitamin D2 and vitamin D3. Vitamin E includes, for example, tocopherol (alpha-tocopherol, beta-tocopherol, gamma-tocopherol, and delta-tocopherol) and tocotrienol (alpha-tocotrienol, beta-tocotrienol, gamma-tocotrienol, and delta-tocotrienol). Vitamin K includes, for example, vitamin K1, vitamin K2, and menaquinone-7.

These fat-soluble vitamins are terpenoids that contain an isoprene skeleton within their molecules and have high affinity with the rubber sealing member 4. Thus, for good permeation and retention in the sealing member 4, using a fat-soluble vitamin as the sealing member deterioration preventing agent is preferable. It is preferable that the fat-soluble vitamin contain two or more, or more preferably, three or more isoprene units. Vitamin A and vitamin E are more preferable due to their high antioxidant effects.

When the rubber that forms the sealing member 4 is subjected to high temperature (for example, 150° C.) during use in the presence of moisture or oxygen, some of its components are oxidized or thermally decomposed. As a result, the rubber contracts and develops cracks. Cracks in the sealing member reduce the effective thickness of the rubber and degrades the sealing performance. The sealing member deterioration preventing agent arranged inside the body case 2 is supplied to the sealing member 4 and permeates it through intermolecular gaps in the sealing member 4. This reduces permeation by oxygen and moisture and suppresses deterioration of the sealing member 4.

In addition, the hydrophilic compound contained in the electrolytic solution reduces the amount of sealing member deterioration preventing agent, immiscible with the hydrophilic compound, entering the capacitor element 3. Thus, the sealing member deterioration preventing agent more easily permeates the sealing member 4, and thus, even in a high-temperature environment during the use of the electrolytic capacitor 1, the sealing member deterioration preventing agent can rapidly permeate the sealing member 4 to reliably prevent deterioration of the sealing member 4. In this way, the life of the electrolytic capacitor 1 can be extended. A design is also possible where part of the sealing member deterioration preventing agent dissolves in the electrolytic solution so that the sealing member deterioration preventing agent gradually permeates the sealing member 4 via the separator 6.

Furthermore, by reducing the amount of sealing member deterioration preventing agent entering inside the capacitor element 3, it is possible to increase the amount of electrolytic solution impregnated in the capacitor element 3. Thus, it is possible to reduce ESR of the electrolytic capacitor 1.

The molecular weight of the sealing member deterioration preventing agent is preferably 3000 or less for good permeation, and more preferably 2000 or less. The molecular weight of the sealing member deterioration preventing agent is preferably 200 or more for good retention in the sealing member 4, more preferably 250 or more, and even more preferably 300 or more. By using a sealing member deterioration preventing agent within this molecular weight range, it is possible to enhance permeation in the sealing member 4 and to maintain the long-term effect of suppressing deterioration of the sealing member. It is also possible to adjust permeability and durability in the sealing member 4 by using two or more types of sealing member deterioration preventing agent with different molecular weights.

Furthermore, since the sealing member deterioration preventing agent allows little oxygen and moisture to permeate the sealing member 4, the sealing member deterioration preventing agent in the electrolytic solution is retained in the capacitor element 3 for an extended period with little degradation such as oxidation. It is thus possible to suppress deterioration of the sealing member 4 over an extended period.

Although the sealing member deterioration preventing agent has an effect of suppressing deterioration of the sealing member 4 even without reaching its external surface, it is more preferable that it reach the external surface of the sealing member 4. In this way, it is possible to suppress deterioration of the sealing member 4 also on its external surface where cracks are more likely to occur, and this helps further prevent entry of oxygen and moisture.

Here, the sealing member deterioration preventing agent may form an oil film on the external surface of the sealing member 4 or form a coating solidified through an oxidation reaction by contact with oxygen in the air. The coating helps to further suppress permeation by oxygen and moisture. Silicone rubber and fluorine rubber have lower airtightness compared to butyl rubber, but providing a coating helps enhance airtightness.

The weight ratio of the sealing member deterioration preventing agent in the sealing member 4 to the sealing member 4 is preferably in the range of 0.1% to 25% by weight. If the weight ratio of the sealing member deterioration preventing agent in the sealing member 4 to the sealing member 4 is lower than 0.1% by weight, it may not be possible to sufficiently fill the gaps between the molecules of the sealing member 4 and thus to obtain an effect of suppressing permeation by moisture.

If the weight ratio of the sealing member deterioration preventing agent in the sealing member 4 to the sealing member 4 is higher than 25% by weight, the sealing member 4 may suffer softening or deformation. This degrades the sealing performance of the sealing member 4, making it impossible to suppress moisture permeation. It is preferable that the hardness (Durometer hardness) of the sealing member 4 after permeation with the sealing member deterioration preventing agent be 70 or more on one of the faces of the sealing member 4 because that helps maintain high sealing performance.

The thickness of the sealing member 4 is associated with the evaporation rate of the electrolytic solution, the moisture permeation amount, and permeation by the sealing member deterioration preventing agent. To maintain low the evaporation of the electrolytic solution and the moisture permeation amount, it is preferable the sealing member 4 have a thickness of 1.4 mm or more. To permeate the entire sealing member 4 with the sealing member deterioration preventing agent and suppress the occurrence of cracks, it is preferable the sealing member 4 have a thickness of 7 mm or less.

The sealing member deterioration preventing agent permeated substantially on the entire surface of the sealing member 4 on the capacitor element 3 side can be confirmed by the following method. First, the sealing member 4 with the electrolytic solution on its surface wiped off is cut at 1 mm from the outer circumference in radial direction into a piece with a thickness of 1 mm and then the piece is ground. Next, the solution extracted from the ground sample with an organic solvent is analyzed using liquid chromatography-mass spectrometry (LC-MS), gas chromatography-mass spectrometry (GC-MS), or the like. The sealing member deterioration preventing agent can be thereby detected.

The electrolytic capacitor 1 is manufactured through the following processes in order: an element formation process, an element housing process, a sealing member fitting process, a molding process, and a repair process. In the element formation process, an anodization process, a terminal formation process, a winding process, and an electrolytic solution impregnation process are further performed in order.

In the anodization process, the surface of the anode foil 5 is first roughened by etching. The etched anode foil 5 is anodized in a chemical solution, and a dielectric oxide film is formed on its surface. In the terminal formation process, the lead terminals 8 and 9 are swaged to be fixed to one ends of the anode foil 5 and cathode foil 7 respectively. In the winding process, the anode foil 5 and cathode foil 7 are wound via the separator 6, and the winding ends are fixed with the tape 12.

In the electrolytic solution impregnation process, the capacitor element 3 is immersed in an electrolytic solution for a predetermined time. The capacitor element 3 impregnated with the electrolytic solution is thus formed. Although the immersion time of the capacitor element 3 varies depending on its size, it can be, for example, one second to several hours, preferably one second to five minutes. Although there is no particular limitation on the immersion temperature of the capacitor element 3, it can be, for example, ° C. to 80° C., preferably 10° C. to 40° C.

In the element housing process, the capacitor element 3 is inserted and housed in the body case 2 through the opening 2b. Here, inside of the body case 2 is filled with the sealing member deterioration preventing agent, and the sealing member deterioration preventing agent is arranged between the capacitor element 3 and the body case 2.

In the element formation process, it is also possible to immerse the capacitor element 3 in an emulsion with the electrolytic solution dispersed with the sealing member deterioration preventing agent and to omit the step of filling the sealing member deterioration preventing agent in the element housing process. In that case, the amount of the sealing member deterioration preventing agent entering inside the capacitor element 3 increases, and the sealing member deterioration preventing agent is arranged between the capacitor element 3 and the sealing member 4 through the separator 6.

In the sealing member fitting process, the sealing member 4 is inserted in and fitted to the body case 2 that houses the capacitor element 3 from the opening 2b side. The lead terminals 8 and 9 of the capacitor element 3 are inserted in the through holes 4a and 4b in the sealing member 4 by press-fitting. Here, the sealing member deterioration preventing agent filled inside the body case 2 is arranged between the capacitor element 3 and the sealing member 4. Even if the sealing member deterioration preventing agent is not fully filled in the body case 2, by arranging the electrolytic capacitor 1 with the end wall portion 2a facing upward, the sealing member deterioration preventing agent is arranged between the capacitor element 3 and the sealing member 4.

In the molding process, the protruding portion 13 that protrudes inward of the body case 2 is formed by swaging, and curling is applied to the open end to form the folded-back portion 14. In the repair process, repair work is performed on the dielectric oxide film formed on the anode foil 5 and cathode foil 7. The repair work is performed, for example, by applying the rated voltage of the capacitor to between the lead terminals 8 and 9 in a high-temperature environment of 125° C. for 30 minutes. Here, arranging the sealing member 4 on the lower side permits the sealing member deterioration preventing agent to permeate in the sealing member 4. The high-temperature environment at this time promotes the permeation of the sealing member deterioration preventing agent into the sealing member 4.

According to the embodiment, an electrolytic solution containing an electrolyte and a hydrophilic compound is retained between the anode foil 5 and the cathode foil 7, and the sealing member deterioration preventing agent immiscible with the hydrophilic compound is arranged inside the body case 2. This allows fast permeation of the sealing member deterioration preventing agent into the sealing member 4, and thus it is possible to suppress the deterioration of the sealing member 4 even in a high-temperature environment and to achieve an electrolytic capacitor 1 with an extended life and a low ESR.

The sealing member deterioration preventing agent is composed of a terpenoid, an unsaturated fatty acid, a polyglycerol ester containing within its molecule an unsaturated fatty acid group, a saturated fatty acid, or a derivative of any of these. In this way, it is possible to easily achieve a sealing member deterioration preventing agent immiscible with a hydrophilic compound.

The hydrophilic compound forms at least part of the solvent in the electrolytic solution with an electrolyte dissolved in it, and has a boiling point of 180° C. or higher. In this way, it is possible to easily achieve an electrolytic capacitor 1 with an extended life even in a high-temperature environment exceeding 150° C.

If the hydrophilic compound forming the solvent in the electrolytic solution has a boiling point of 205° C. or higher, it is possible to easily achieve a long-life electrolytic capacitor 1 in an even higher temperature environment.

The hydrophilic compound that forms a solvent in the electrolytic solution includes sulfolane, ethylene glycol, diethylene glycol, triethylene glycol, polyethylene glycol, glycerol, polyglycerol, or a derivative of any of these. In this way, it is possible to easily achieve a solvent of a hydrophilic compound with which the sealing member deterioration preventing agent is immiscible.

By adding in an electrolytic solution a hydrophilic compound that includes polyethylene glycol with a molecular weight of 1000 or more, it is possible to easily achieve an electrolytic solution with which the sealing member deterioration preventing agent is immiscible.

Second Embodiment

Next, an electrolytic capacitor 1 according to a second embodiment will be described. The electrolytic capacitor 1 of this embodiment is formed as a hybrid type in which the capacitor element 3 holds, between the anode foil 5 and the cathode foil 7, a solid electrolyte along with an electrolytic solution similar to that in the first embodiment. In other respects, the second embodiment is similar to the first embodiment.

The solid electrolyte is an electrically conductive polymer, and is provided as a solid electrolyte layer on the surface of at least part of the anode foil 5, the cathode foil 7, and the separator 6. The electrically conductive polymer is a polymer of pyrrole, thiophene, aniline, or a derivative of any of these. The electrically conductive polymer is doped with, as a dopant, a compound containing a sulfonic acid group, such as polystyrene sulfonic acid. The electrically conductive polymer may be of a type self-doped within its molecule by having a sulfonic acid group as a substituent group in a side chain.

The solid electrolyte layer is formed by impregnating the capacitor element 3 with a dispersion liquid having an electrically conductive polymer in water, or with an aqueous solution of an electrically conductive polymer, and then drying the capacitor element 3.

The electrolytic solution held between the anode foil 5 and the cathode foil 7 is formed in a similar manner to that in the first embodiment. Specifically, an organic amine salt of a boric acid compound or a carboxylic acid compound or the like is used as the electrolyte. A boric acid compound or an aromatic carboxylic acid is preferred because it gives the hybrid-type electrolytic capacitor 1 a long life.

Used as the solvent in the electrolytic solution is a high-boiling-point solvent with a boiling point of 150° C. or higher. Usable as the solvent is gamma-butyrolactone, sulfolane, ethylene glycol, diethylene glycol, triethylene glycol, polyethylene glycol, glycerol, polyglycerol, or a derivative of any of these.

It is preferable to use, as a hydrophilic compound solvent, sulfolane, ethylene glycol, diethylene glycol, triethylene glycol, polyethylene glycol, polyglycerol, or a derivative of any of these.

It is more preferable to use, as a hydrophilic compound solvent, ethylene glycol, diethylene glycol, polyethylene glycol, polyglycerol, or a derivative of any of these. Containing a hydroxyl group or an ether group, these improve the repair properties and the withstand voltage of the dielectric oxide film, have high affinity with the electrically conductive polymer, and have a high boiling point. This helps keep the ESR of the electrolytic capacitor 1 low for an extended period.

The electrolytic solution covers at least part of the solid electrolyte layer; it thereby suppresses contact of the solid electrolyte layer with oxygen and suppresses oxidation-induced deterioration of the solid electrolyte layer. While it is preferable that the electrolytic solution cover substantially the entire solid electrolyte inside the capacitor element 3, even if the solvent in the electrolytic solution evaporates, the additive in the electrolytic solution remains to suppress oxidation-induced deterioration of the solid electrolyte layer.

An additive like those in the first embodiment may be added to the electrolytic solution. As a hydrophilic compound additive, polyethylene glycol with a molecular weight of 1000 or more may be added. As an additive to the electrolytic solution, an antioxidant soluble in the hydrophilic compound solvent may be contained. This permits the electrolytic solution to cover at least part of the solid electrolyte layer, and thus helps suppress oxidation-induced deterioration of the solid electrolyte layer.

It is preferable that the antioxidant soluble in a hydrophilic compound solvent not interfere with the repair of the dielectric oxide film by oxidation. Accordingly, the content of the antioxidant in the electrolytic solution is preferably 10% or less, and more preferably 3% or less. Adding a sealing member deterioration preventing agent immiscible with the electrolytic solution along with an antioxidant miscible with the electrolytic solution permits the effect of suppressing deterioration of the sealing member and the effect of suppressing oxidation of the electrically conductive polymer to act in synergy. It is thus possible to suppress deterioration of the ESR for an extended period.

The hybrid-type electrolytic capacitor 1 of this embodiment is manufactured through, in addition to the processes through which the electrolytic capacitor 1 of the first embodiment is manufactured, an element chemical conversion process and a solid electrolyte layer forming process. The element chemical conversion process and the solid electrolyte layer forming process are performed between the winding process and the electrolytic solution impregnation process.

In the element chemical conversion process, the capacitor element 3 is immersed in a chemical conversion liquid to be anodized. This repairs parts of the dielectric oxide film lost in the winding process or the like.

In the solid electrolyte layer forming process, first, the capacitor element 3 is immersed in a dispersion liquid having particles or aggregates of an electrically conductive polymer dispersed in a dispersion medium so that the capacitor element 3 is impregnated with the dispersion liquid. Then, the capacitor element 3 is dried at high temperature to remove the dispersion medium and thereby form the solid electrolyte layer.

It is preferable that the dispersion medium not dissolve the electrically conductive polymer, and it is more preferable to use water with consideration given to ease of handling and dispersion properties. For example, the capacitor element 3 can be immersed, under reduced pressure, in a dispersion liquid having particles of polyethylene dioxythiophene dispersed in water so that the capacitor element 3 is impregnated with the dispersion liquid. Here, a dopant may be added to the dispersion medium. The dispersion medium can be removed by drying the capacitor element 3 at 100° C. to 200° C.

In the solid electrolyte layer forming process, the solid electrolyte layer may be formed by oxidation polymerization of a polymerizable monomer. Specifically, the capacitor element 3 is impregnated with a polymerizable monomer (for example, a monomer of ethylene dioxythiophene). Next, the capacitor element 3 is immersed in an oxidant (for example, an ethanol solution of iron p-toluenesulfonate) to perform oxidation polymerization. This produces a solid electrolyte layer formed of an electrically conductive polymer (for example, polyethylene dioxythiophene).

With this embodiment, as with the first embodiment, a solid electrolyte and a liquid (electrolytic solution) containing a hydrophilic compound is held between the anode foil 5 and the cathode foil 7, and a sealing member deterioration preventing agent immiscible with the hydrophilic compound is arranged inside the body case 2. This permits fast permeation of the sealing member 4 by the sealing member deterioration preventing agent and suppresses deterioration of the sealing member 4 in a high-temperature environment. It is thus possible to obtain an electrolytic capacitor 1 with a long life and a low ESR.

Moreover, owing to the hydrophilic compound forming at least part of the solvent in the electrolytic solution and having a boiling point of 180° C. or higher, it is possible to obtain an electrolytic capacitor 1 with a long life and a low ESR in a high-temperature environment over 150°.

Third Embodiment

Next, a third embodiment will be described. In the electrolytic capacitor 1 according to this embodiment, the capacitor element 3 holds a solid electrolyte and a predetermined functional liquid. In other respects, the third embodiment is similar to the second embodiment.

The solid electrolyte is an electrically conductive polymer similar to that in the second embodiment. The electrically conductive polymer helps reduce the ESR of the electrolytic capacitor 1.

As the functional liquid held in the capacitor element, it is possible to use a liquid similar to the solvent for the electrolytic solution in the second embodiment. Specifically, usable as the functional liquid that is a hydrophilic compound is sulfolane, ethylene glycol, diethylene glycol, triethylene glycol, polyethylene glycol, glycerol, polyglycerol, or a derivative of any of these.

Using a polyalkylene glycol as the functional liquid helps enhance the withstand voltage of the electrolytic capacitor 1. Using a compound containing a hydroxy group, such as sugar or glycerol, helps enhance the electrical conductivity of the solid electrolyte layer.

Also usable as the functional liquid is a lipophilic liquid such as gamma-butyrolactone mixed with a hydrophilic compound such as polyethylene glycol with a molecular weight of 1000 or more.

With this embodiment, as with the first and second embodiments, a solid electrolyte and a liquid containing a hydrophilic compound (functional liquid) are held between the anode foil 5 and the cathode foil 7, and a sealing member deterioration preventing agent immiscible with the hydrophilic compound is arranged inside the body case 2. This permits fast permeation of the sealing member 4 by the sealing member deterioration preventing agent and suppresses deterioration of the sealing member 4 in a high-temperature environment. It is thus possible to obtain an electrolytic capacitor 1 with a long life and a low ESR.

Fourth Embodiment

Next, a fourth embodiment will be described. In an electrolytic capacitor 1 according to this embodiment, the capacitor element 3 holds a solid electrolyte and a predetermined solid-at-normal-temperature substance. In other respects, the fourth embodiment is similar to the second embodiment.

The solid electrolyte is an electrically conductive polymer similar to that in the second embodiment. The electrically conductive polymer helps reduce the ESR of the electrolytic capacitor 1.

The solid-at-normal-temperature substance has an electrolyte dissolved in a solvent that is solid at normal temperature (for example, 30° C.) and that melts in an environment that may occur as the electrolytic capacitor 1 is used where the temperature is higher (for example, 50° C. or more) than normal temperature. Thus, the solid-at-normal-temperature substance is solid at normal or lower temperature and becomes a liquid electrolytic solution in an environment of higher temperature than the normal temperature.

The solvent contained in the solid-at-normal-temperature substance is a hydrophilic compound. Usable as the solvent that is a hydrophilic compound is polyethylene glycol, sugar, or the like. These are solid at normal temperature and have a melting point of 50° C. or more.

Usable as the polyethylene glycol is, for example, PEG2000 (melting point: 51° C.), PEG4000 (melting point: 56° C.), PEG6000 (melting point: 58° C.), PEG10000 (melting point: 62° C.), or PEG20000 (melting point: 63° C.). Note that PEG2000 denotes polyethylene glycol with an average molecular weight of 2000. Similar definitions apply to PEG4000, PEG6000, PEG10000, and PEG20000.

Usable as the sugar is xylitol (melting point: 92° C.) or sorbitol (melting point: 95° C.).

Examples of the electrolyte contained in the solid-at-normal-temperature substance include acids and bases. Usable as the acid as the electrolyte contained in the solid-at-normal-temperature substance is maronic acid, succinic acid, glutaric acid, adipic acid, sebacic acid, decanedicarboxylic acid, tartronic acid, fumaric acid, maleic acid, citraconic acid, malic acid, tartaric acid, phthalic acid, nitrophthalic acid, citric acid, tricarbanilic acid, pyromellitic acid, boric acid, phosphoric acid, borodisalicylic acid, borodiglycolic acid, trinitrophenol, hydroxynitrophenoil, or sulfosalicylic acid.

Usable as the base as the electrolyte contained in the solid-at-normal-temperature substance is ammonia, nonoethylamine, diethylamine, triethylamine, monoethanolamine, diethanolamine, triethanolamine, benzylamine, napthylamine, morpholine, aniline, acetanilide, phenanthroline, caffeine, or imidazole.

When the electrolytic capacitor 1 designed as described above is used in a high-temperature environment, the solid-at-normal-temperature substance liquefies and the solvent that is a hydrophilic compound is arranged in the capacitor element 3. This helps reduce the amount of sealing member deterioration preventing agent that enters the capacitor element 3 and makes it easier for the sealing member deterioration preventing agent to permeate the sealing member 4. Moreover, the smaller amount of sealing member deterioration preventing agent inside the capacitor element 3 permits it to be impregnated with a larger amount of solid-at-normal-temperature substance. This helps reduce the ESR of the electrolytic capacitor 1 and extend its life.

The solid-at-normal-temperature substance is manufactured through a melting process, a solidifying process, and a crushing process. In the melting process, the solvent is put in a container and is heated to above the melting point of the solvent. The melting point varies from solvent to solvent as mentioned above. Then, the electrolyte is put in the liquified solvent to prepare a solution in which the electrolyte is dissolved evenly in the solvent. The heating in the melting process can be achieved using a heater or a high-frequency heating device.

In the solidifying process, the container mentioned above is cooled down to normal temperature to solidify the solid-at-normal-temperature substance. Meanwhile, in the solid-at-normal-temperature substance, the electrolyte is arranged in a form dispersed in the solidified solvent. In the crushing process, the solid-at-normal-temperature substance solidified in the solidifying process is crushed. Thus, the solid-at-normal-temperature substance is prepared into powder form.

The electrolytic capacitor 1 of this embodiment is manufactured in a similar manner to that of the second embodiment: in the element housing process, the solid-at-normal-temperature substance in powder form is housed in the body case 2 and is heated to above the melting point of the solvent in the solid-at-normal-temperature substance. This melts the solid-at-normal-temperature substance inside the body case 2. After that, the capacitor element 3 is housed in the body case 2.

Meanwhile, the solid-at-normal-temperature substance in liquid phase enters the capacitor element 3 by capillary action. As a result, the solid-at-normal-temperature substance is arranged between the anode foil 5 and the cathode foil 7 and between the capacitor element 3 and the body case 2. Then the body case 2 having the capacitor element 3 housed in it is cooled to solidify the solid-at-normal-temperature substance, and after that the body case 2 is filled with the sealing member deterioration preventing agent, to be followed by the subsequent sealing member fitting process.

With this embodiment, as with the first to third embodiments, a solid-at-normal-temperature substance containing a solid electrolyte and a hydrophilic compound is held between the anode foil 5 and the cathode foil 7, and the sealing member deterioration preventing agent, which is immiscible with the hydrophilic compound, is arranged inside the body case 2. This permits fast permeation of the sealing member 4 by the sealing member deterioration preventing agent and suppresses deterioration of the sealing member 4 in a high-temperature environment. It is thus possible to obtain an electrolytic capacitor 1 with a long life and a low ESR.

Moreover, owing to the hydrophilic compound forming at least part of the solvent in the solid-at-normal-temperature substance, the hydrophilic compound in liquid phase at temperature higher than normal temperature suppresses permeation of the capacitor element 3 by the sealing member deterioration preventing agent. This allows fast permeation of the sealing member 4 with the sealing member deterioration preventing agent in a high-temperature environment.

Moreover, owing to the hydrophilic compound being PEG2000. PEG4000, PEG6000. PEG10000, PEG20000, xylitol, or sorbitol, it is possible to easily obtain a hydrophilic compound with which the sealing member deterioration preventing agent is immiscible.

In the first to fourth embodiments, the electrodes (anode foil 5 and cathode foil 7) of the capacitor element 3 are wound up with the separator 6 in between; instead, the pair of electrodes that face each other across the separator may be flat.

Presented below are practical examples built to evaluate the electrolytic capacitors 1 of the different embodiments.

Practical Example 1

Practical Example 1 was formed as the electrolytic capacitor 1 according to the first embodiment. In Practical Example 1, the solvent in the electrolytic solution was ethylene glycol, and the sealing member deterioration preventing agent was alpha-tocopherol, which is immiscible with ethylene glycol. The weight ratio of the electrolytic solution to the sealing member deterioration preventing agent was 75:25. The weight ratio of the solvent in the electrolytic solution to the solute was 85:15. The sealing member 4 was formed of butyl rubber.

Practical Example 2

Practical Example 2 was formed as the electrolytic capacitor 1 according to the second embodiment. In Practical Example 2, the solvent in the electrolytic solution was sulfolane, and the sealing member deterioration preventing agent was alpha-tocopherol, which is immiscible with sulfolane. The weight ratio of the electrolytic solution to the sealing member deterioration preventing agent was 75:25. The weight ratio of the solvent in the electrolytic solution to the solute was 85:15. The sealing member 4 was formed of butyl rubber.

Practical Example 3

Practical Example 3 was formed as the electrolytic capacitor 1 according to the third embodiment. In Practical Example 3, the solvent in the functional liquid was triethylene glycol, and the sealing member deterioration preventing agent was alpha-tocopherol, which is immiscible with triethylene glycol. The weight ratio of the functional liquid to the sealing member deterioration preventing agent was 75:25. The sealing member 4 was formed of butyl rubber.

Comparative Example 1

For comparison, comparative examples were prepared. In Comparative Example 1, in place of the electrolytic solution in Practical Example 1, gamma-butyrolactone was used. Alpha-tocopherol as the sealing member deterioration preventing agent is miscible with gamma-butyrolactone

Comparative Example 2

In Comparative Example 2, in place of the electrolytic solution in Practical Example 2, gamma-butyrolactone was used. Alpha-tocopherol as the sealing member deterioration preventing agent is miscible with gamma-butyrolactone.

Comparative Example 3

In Comparative Example 3, in place of the electrolytic solution in Practical Example 2, a copolymer of polyethylene glycol with polypropylene glycol was used. Alpha-tocopherol as the sealing member deterioration preventing agent is miscible with a copolymer of polyethylene glycol with polypropylene glycol.

Comparative Example 4

In Comparative Example 4, the sealing member deterioration preventing agent was omitted from the electrolytic capacitor 1 of Practical Example 2.

Comparative Example 5

In Comparative Example 5, the sealing member deterioration preventing agent was omitted from the electrolytic capacitor 1 of Practical Example 3.

Comparative Example 6

In Comparative Example 6, the sealing member deterioration preventing agent was omitted from the electrolytic capacitor 1 of Comparative Example 2.

Comparative Example 7

In Comparative Example 7, the sealing member deterioration preventing agent was omitted from the electrolytic capacitor 1 of Comparative Example 3.

In addition, for Evaluation Test 1, which will be described later, samples obtained by omitting the sealing member deterioration preventing agent from Practical Example 1 and Comparative Example 1 were prepared.

With the electrolytic capacitor 1 of each of the practical examples and the comparative examples presented above, Evaluation Tests 1 to 3 were performed as described below. In Evaluation Test 1, the ratios of relevant properties of Practical Example 1 and Comparative Example 1 to those of the samples from which the sealing member deterioration preventing agent was omitted were measured. Specifically, with each of Practical Example 1, Comparative Example 1, and the samples obtained by omitting the sealing member deterioration preventing agent from those, its properties, specifically capacitance, tan δ, and ESR, were measured. Then, those properties of Practical Example 1 and Comparative Example 1 were expressed in their ratios to the corresponding properties of the samples without the sealing member deterioration preventing agent taken as one.

In Evaluation Tests 2 and 3, with each of Practical Examples 2 and 3 and Comparative Examples 2 to 7, the permeation of the sealing member 4 by the sealing member deterioration preventing agent was inspected. Specifically, the electrolytic capacitor 1 was placed with the outer surface of the sealing member 4 up in an atmosphere of 175° C. to be subjected to high-temperature storage for 500 hours: after that, the weight change and the height difference change rate in the sealing member 4 were measured. Evaluation Tests 2 and 3 were performed simultaneously using the same sample, the number of samples being five for each of the practical and comparative examples.

In Evaluation Test 2, the weight change in the sealing member 4 was calculated by subtracting the weight of the sealing member 4 before assembly of the electrolytic capacitor 1 from the weight of the sealing member 4 taken out of the electrolytic capacitor 1 disassembled after the test.

In Evaluation Test 3, used as the height difference for calculating the height difference change rate in the sealing member 4 was the distance (the average for a plurality of points) from a reference plane to the region between the lead terminals 8 and 9 along the height direction. Here, the reference plane was the top face of the folded-back portion 14 of the body case 2 with the sealing member 4 placed with its outer surface up, and the distance from the reference plane was measured on a three-dimensional coordinate measuring machine.

For the height difference change rate, a positive value indicates the direction in which the height difference decreases and a negative value indicates the direction in which the height difference increases. A height difference change rate higher than +100% indicates that the surface of the sealing member 4 bulges from the reference plane and thus suggests deteriorating sealing performance.

TABLE 1

| | | Property Ratios | | |
|---|---|---|---|---|
| | Solvent | Capacitance | tanδ | ESR |
| Practical Example 1 | Ethylene glycol | 0.96 | 1.03 | 1.01 |
| Comparative Example 1 | Gamma-butyrolactone | 1.00 | 1.92 | 1.67 |

Table 1 shows the results of Evaluation Test 1. Table 1 reveals the following. Comparative Example 1, when the sealing member deterioration preventing agent was used in it, exhibited greater property deterioration than when the sealing member deterioration preventing agent was omitted. By contrast, with Practical Example 1, even when the sealing member deterioration preventing agent was used in it, only a small portion of it dissolved in the electrolytic solution, and this helped suppress deterioration in the properties of the electrolytic capacitor 1.

TABLE 2

| | Solvent | Sealing Member Degradation Suppressant | Weight Change |
|---|---|---|---|
| Practical Example 2 | Sulfolane | Alpha-tocopherol | 8.47% |
| Practical Example 3 | Triethylene glycol | Alpha-tocopherol | 13.18% |
| Comparative Example 2 | Gamma-butyrolactone | Alpha-tocopherol | 11.49% |
| Comparative Example 3 | Polyethylene glycol-polypropylene glycol copolymer | Alpha-tocopherol | 5.57% |
| Comparative Example 4 | Sulfolane | No | −6.60% |
| Comparative Example 5 | Triethylene glycol | No | −5.60% |
| Comparative Example 6 | Gamma-butyrolactone | No | −4.80% |
| Comparative Example 7 | Polyethylene glycol-polypropylene glycol copolymer | No | −5.87% |

Figure 5:
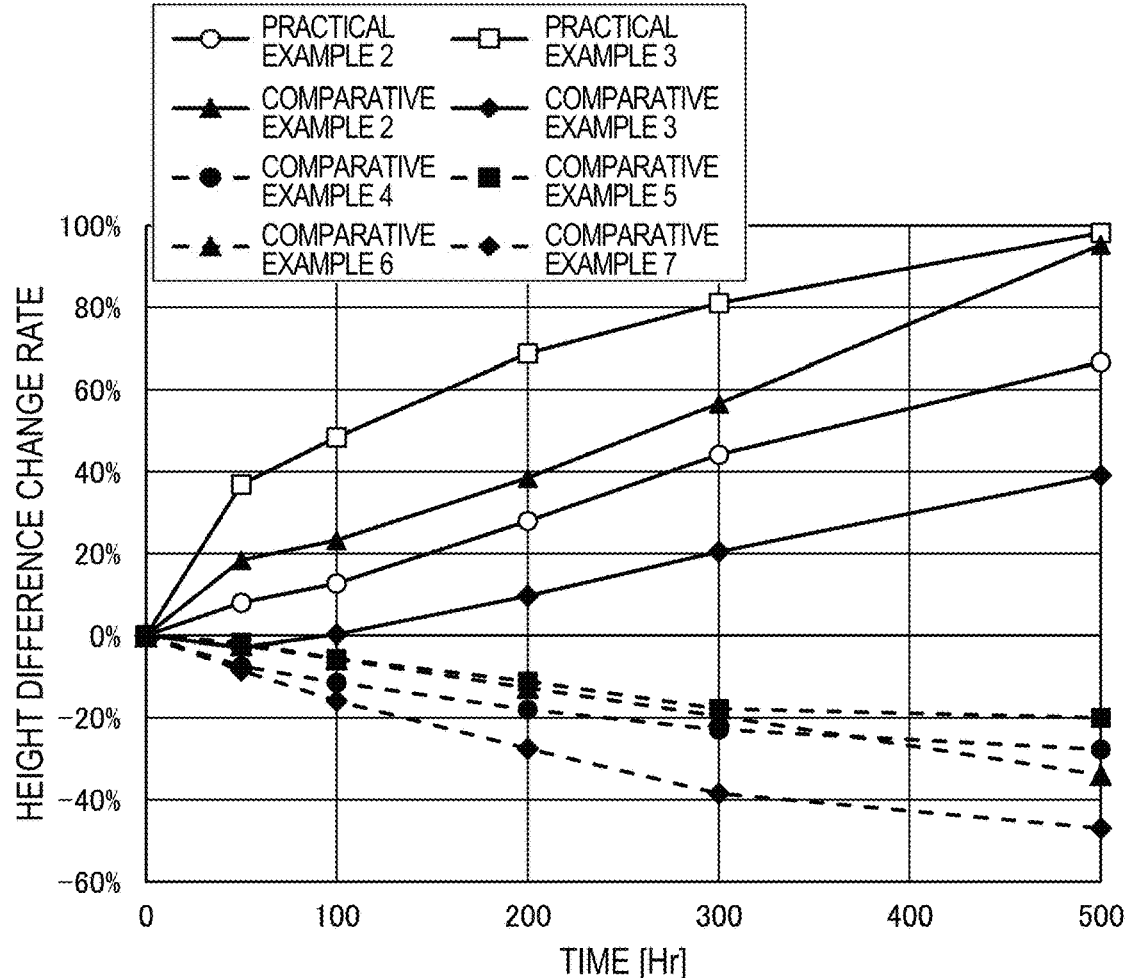
FIG. 5 is a diagram showing the results of evaluation tests in connection with Practical Examples 2 and 3 and Comparative Examples 2 to 7 according to the present invention.
Figure 6:
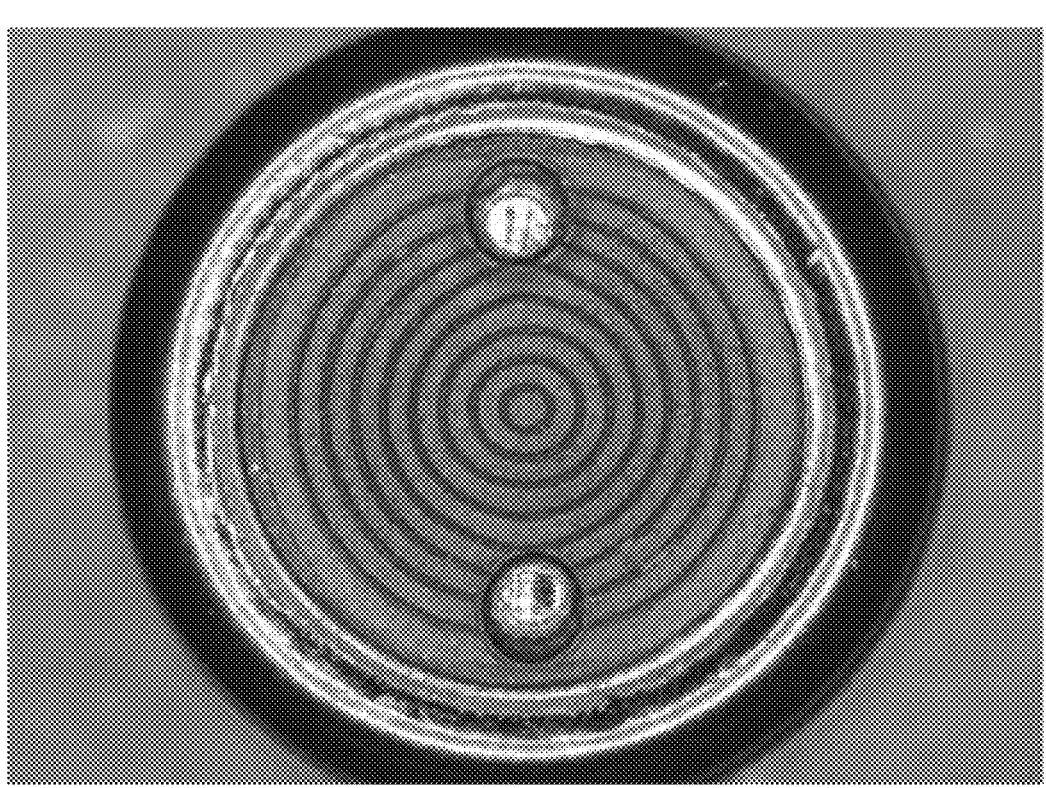
FIG. 6 is a diagram showing the state of a sealing member in Practical Example 3 according to the present invention after the evaluation tests of the electrolytic capacitor.

Table 2 shows the results of Evaluation Test 2, and FIG. 5 shows the results of Evaluation Test 3. FIG. 6 shows the state of the sealing member 4 in Practical Example 3 after Evaluation Tests 2 and 3, and FIG. 7 shows the state of the sealing member 4 in Comparative Example 5 after Evaluation Tests 2 and 3.

Table 2 and FIG. 5 reveal the following. The sealing member deterioration preventing agent contained inside the body case 2 is considered to result in the sealing member 4 being permeated with the sealing member deterioration preventing agent. Thus, after the tests, the sealing member 4 exhibits an increase in weight, the height difference change rate having a positive value. By contrast, with no sealing member deterioration preventing agent contained inside the body case 2, a drop in weight is observed, the height difference change rate having a negative value. This is considered to indicate heat-induced decomposition and evaporation of components of the sealing member 4 resulting in contraction of the sealing member 4.

Figure 7:
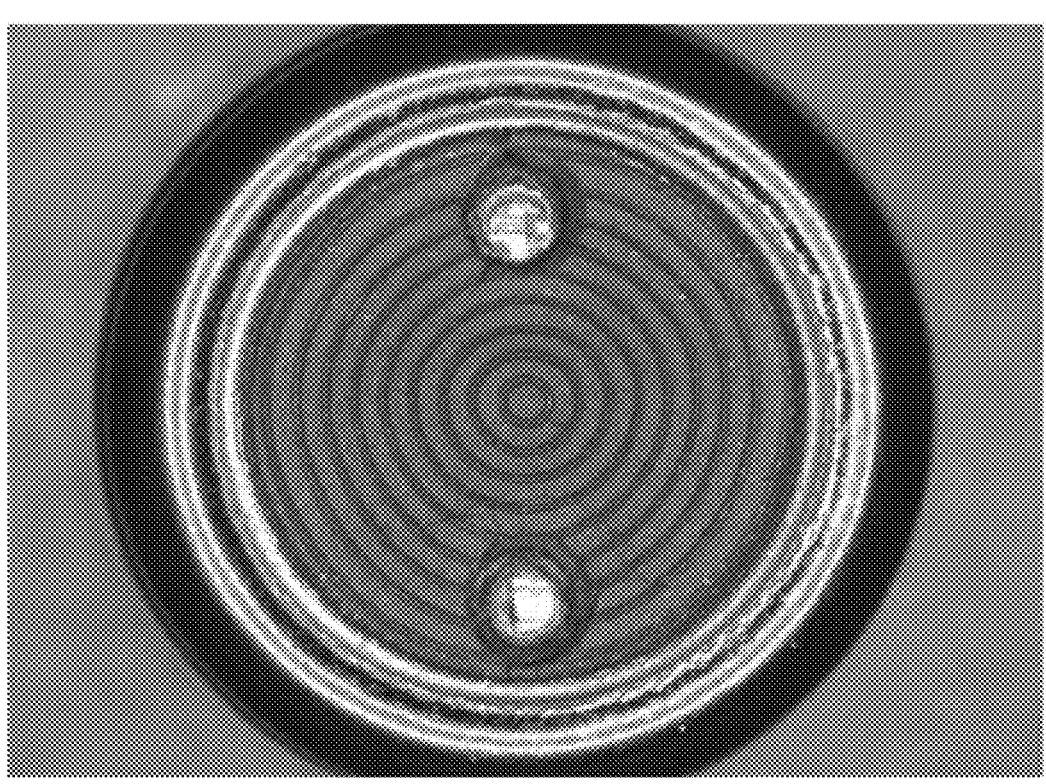
FIG. 7 is a diagram showing the state of a sealing member in Comparative Example 5 according to the present invention after the evaluation tests of the electrolytic capacitor.

Moreover, as shown in FIG. 7, in Comparative Example 5, in which no sealing member deterioration preventing agent was contained inside the body case 2, the height difference increased greatly at the lapse of 500 hours at 175° C. (with a negative height difference change rate), and contraction of the sealing member 4 and the resulting cracks were observed.

By contrast, as shown in FIG. 6, when the sealing member deterioration preventing agent was contained inside the body case 2 (Practical Example 3), the sealing member 4 did not contract and no cracks developed in the outer surface of the sealing member 4 as observed visually. As a result of the sealing member 4 not contracting, cracks were less likely to develop in the sealing member 4, and gaps were less likely to form between the sealing member 4 and the lead terminals 8 and 9 and between the sealing member 4 and the body case 2. Thus, satisfactory sealing performance was maintained.

If the weight change in the sealing member 4 at the lapse of 500 hours at 175° C. was 13.18% or less, the height difference change rate was less than 100%, and no deterioration of sealing performance resulting from permeation by the sealing member deterioration preventing agent was observed.

INDUSTRIAL APPLICABILITY

The present invention finds applications in automobiles, electronic appliances, and the like that include circuits having electrolytic capacitors mounted in them.

REFERENCE SIGNS LIST 1 electrolytic capacitor
2 body case
2a end wall portion
2b opening
3 capacitor element
4 sealing member
4a, 4b through hole
5 anode foil
6 separator
7 cathode foil
8, 9 lead terminal
12 tape
13 protruding portion
14 folded-back portion
15 seat plate
15a, 15b through hole
The invention claimed is:

1. An electrolytic capacitor, comprising:
a capacitor element in which an anode foil and a cathode foil each having a dielectric oxide film face each other across a separator;
a body case that houses the capacitor element; and
a sealing member that seals the body case,
wherein
an electrolyte and a liquid containing a hydrophilic compound are held between the anode foil and the cathode foil,
a sealing member deterioration preventing agent immiscible with the hydrophilic compound is arranged inside the body case,
the sealing member deterioration preventing agent is arranged inside the body case, in a state immiscible with the hydrophilic compound within the capacitor element,
the liquid contains the hydrophilic compound as at least part of a solvent,
the liquid is an electrolytic solution having the electrolyte dissolved in the solvent, and the hydrophilic compound accounts for 50% by weight of the solvent.

2. The electrolytic capacitor according to claim 1, wherein the sealing member deterioration preventing agent is a terpenoid, an unsaturated fatty acid, a polyglycerol ester containing within a molecule thereof an unsaturated fatty acid group, a saturated fatty acid, or a derivative of any thereof.

3. The electrolytic capacitor according to claim 1, wherein the hydrophilic compound has a boiling point of 180° C. or higher.

4. The electrolytic capacitor according to claim 3, wherein the hydrophilic compound has a boiling point of 205° C. or higher.

5. The electrolytic capacitor according to claim 3, wherein the hydrophilic compound contains sulfolane, ethylene glycol, diethylene glycol, triethylene glycol, polyethylene glycol, glycerol, polyglycerol, or a derivative thereof.

6. The electrolytic capacitor according to claim 1, wherein is a solid electrolyte is held between the anode foil and the cathode foil,
the capacitor element is impregnated with the electrolytic solution,
the hydrophilic compound forms at least part of the electrolytic solution, and
the hydrophilic compound has a boiling point of 180° C. or higher.

7. The electrolytic capacitor according to claim 1, wherein the hydrophilic compound contains polyethylene glycol with a molecular weight of 1000 or more.

8. The electrolytic capacitor according to claim 1, wherein the sealing member deterioration preventing agent is, with part thereof in an undissolved state, arranged in the body case.

9. The electrolytic capacitor according to claim 1, wherein the sealing member deterioration preventing agent is a compound of which part remains in an undissolved state in the hydrophilic compound solvent.

* * * * *